United States Patent
Fujiwara et al.

(10) Patent No.: US 12,334,814 B2
(45) Date of Patent: Jun. 17, 2025

(54) POWER CONVERTER

(71) Applicant: Mitsubishi Electric Corporation, Tokyo (JP)

(72) Inventors: Kenji Fujiwara, Tokyo (JP); Yusuke Shirouchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 189 days.

(21) Appl. No.: 18/270,488

(22) PCT Filed: Feb. 25, 2021

(86) PCT No.: PCT/JP2021/006973
§ 371 (c)(1),
(2) Date: Jun. 30, 2023

(87) PCT Pub. No.: WO2022/180709
PCT Pub. Date: Sep. 1, 2022

(65) Prior Publication Data
US 2024/0063730 A1    Feb. 22, 2024

(51) Int. Cl.
*H02M 1/32* (2007.01)
*H02M 1/00* (2007.01)
(Continued)

(52) U.S. Cl.
CPC .......... *H02M 1/327* (2021.05); *H02M 7/003* (2013.01); *H02M 1/007* (2021.05); *H02M 7/4835* (2021.05); *H02M 7/487* (2013.01)

(58) Field of Classification Search
CPC ...... H02M 1/007; H02M 1/327; H02M 7/003; H02M 7/4835; H02M 7/487
See application file for complete search history.

(56) References Cited

U.S. PATENT DOCUMENTS

2005/0194925 A1    9/2005  Ito et al.
2011/0211381 A1    9/2011  Iwata et al.
(Continued)

FOREIGN PATENT DOCUMENTS

JP    2005-229714 A    8/2005
JP    2013-021891 A    1/2013
(Continued)

OTHER PUBLICATIONS

International Search Report and Written Opinion mailed on May 18, 2021, received for PCT Application PCT/JP2021/006973, filed on Feb. 25, 2021, 9 pages including English Translation.
(Continued)

*Primary Examiner* — Jue Zhang
(74) *Attorney, Agent, or Firm* — XSENSUS LLP

(57) ABSTRACT

Provided are a sub inverter of a full-bridge constituted by two arms: an arm and an arm, each of which is mounted on a different module, a main controller to drive and control the sub inverter by switching an operation mode between a first mode in which a first arm performs a low-frequency switching operation and a second arm performs a high-frequency switching operation, and a second mode in which the second arm performs a low-frequency switching operation and the first arm performs a high-frequency switching operation, and an operation ratio setting circuitry to set an operation ratio on the basis of a bias of a temperature rise between the modules.

19 Claims, 12 Drawing Sheets

(51) Int. Cl.
*H02M 7/00* (2006.01)
*H02M 7/483* (2007.01)
*H02M 7/487* (2007.01)

(56) References Cited

U.S. PATENT DOCUMENTS

2014/0016380 A1\* 1/2014 Barbosa .............. H02M 7/4835
363/71
2018/0248493 A1\* 8/2018 Mihalache ............ H02M 7/483

FOREIGN PATENT DOCUMENTS

JP 2014-014203 A 1/2014
WO 2010/058536 A1 5/2010

OTHER PUBLICATIONS

Extended European Search Report issued Mar. 14, 2024 in European Patent Application No. 21927811.6, 9 pages.

\* cited by examiner

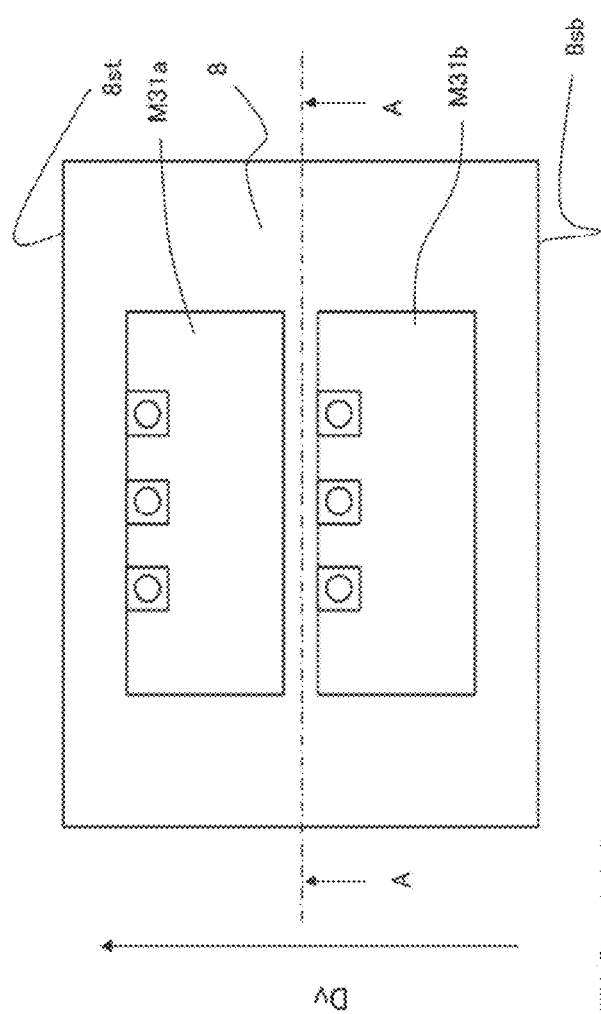
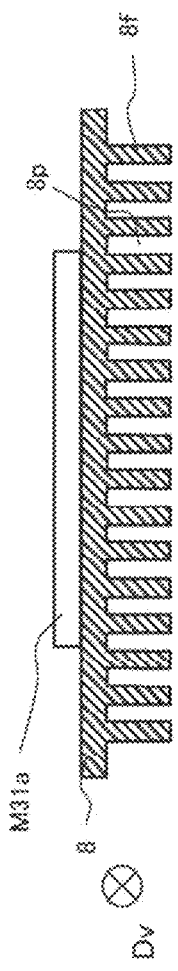
FIG. 10A
FIG. 10B

POWER CONVERTER

CROSS-REFERENCE TO RELATED APPLICATION

The present application is based on PCT filing PCT/JP2021/006973, filed Feb. 25, 2021, the entire contents of which are incorporated herein by reference.

TECHNICAL FIELD

The present application relates to a power converter.

BACKGROUND ART

In recent years, electrified systems as typified by electric vehicles as a trend from engine to motor drive, have come into wide use, and research on the electrification of aircraft is also being conducted around the world in response to the trend toward $CO_2$ reduction. In particular, aircraft equipment requires a highly efficient, lightweight, and compact power converter to improve fuel efficiency, and an inverter that converts DC power to AC power is essential to drive an AC motor.

Among the inverters, a multi-level inverter in which a high-voltage low-frequency main inverter and a low-voltage high-frequency sub inverter are connected in series and the sum of each output voltage is output, as a power converter (refer to, for example, Patent Document 1), is expected to be an inverter as a technology for high efficiency and miniaturization. In the present application, the multi-level inverter will be referred to as a gradationally controlled voltage inverter.

PRIOR ART DOCUMENT

Patent Document

Patent Document 1: Domestic re-publication of PCT international application WO2010/058536 (paragraphs 0009 to 0015, FIG. 1 to FIG. 5)

SUMMARY OF INVENTION

Problems to be Solved by Invention

In the gradationally controlled voltage inverter, the amount of heat generated in the sub inverter, which is driven at a high frequency, is larger than that in the main inverter, which is driven at a low frequency, and a cooler must be installed accordingly. On the other hand, a full-bridge inverter is used for the sub inverter, and the two arms that constitute the full-bridge inverter are separately mounted in 2-in-1 type modules, each of which has two switching elements connected in series.

In this case, for example, variations in a heat dissipation characteristic of each module or a module characteristic due to differences in wind conditions for air cooling, water conditions for water cooling, or height in its arrangement, etc., will result in a bias of a temperature rise between the modules. Therefore, a design on the heat dissipation tailored to the high temperature side is required, resulting in an excessive module or cooler size to hinder the miniaturization.

The present application discloses a technology to solve the above problems and an aim thereof is to obtain a compact and highly efficient power converter.

Means for Solving Problems

A power converter disclosed in the present application includes a full-bridge inverter constituted by two arms each of which is mounted on a different module, a main control unit to drive the full-bridge inverter by switching an operation mode on a basis of a set operation ratio between a first mode and a second mode, the first mode being a mode in which a first arm of the two arms is made to perform a switching operation at a first frequency for determining output polarity and a second arm is made to perform a switching operation for PWM modulation at a second frequency higher than the first frequency, the second mode being a mode in which the second arm is made to perform a switching operation at the first frequency and the first arm is made to perform a switching operation at the second frequency, and an operation ratio setting unit to set the operation ratio on a basis of a bias of a temperature rise between the modules.

Effect of Invention

According to the power converter disclosed in the present application, even if there are variations in the heat dissipation characteristic and the module characteristic for each of the modules, a period for the driving with the high-frequency switching is adjusted to suppress the bias of the temperature between the modules, so that a compact and highly efficient power converter can be obtained.

BRIEF DESCRIPTION OF DRAWINGS

FIG. 10A and FIG. 10B are a side view and a cross sectional view, respectively, showing an example in which the modules each forming each of the two arms constituting the sub inverter of the gradationally controlled voltage inverter adopted by the power converter according to Embodiment 1 are mounted on a cooler of a natural air cooling type.

Each of FIG. 11A to FIG. 11D is a schematic diagram showing a current path at negative current polarity formed by the switching pattern for changing a voltage output in the sub inverter in the gradationally controlled voltage inverter adopted by the power converter according to Embodiment 1.

Figure 12:
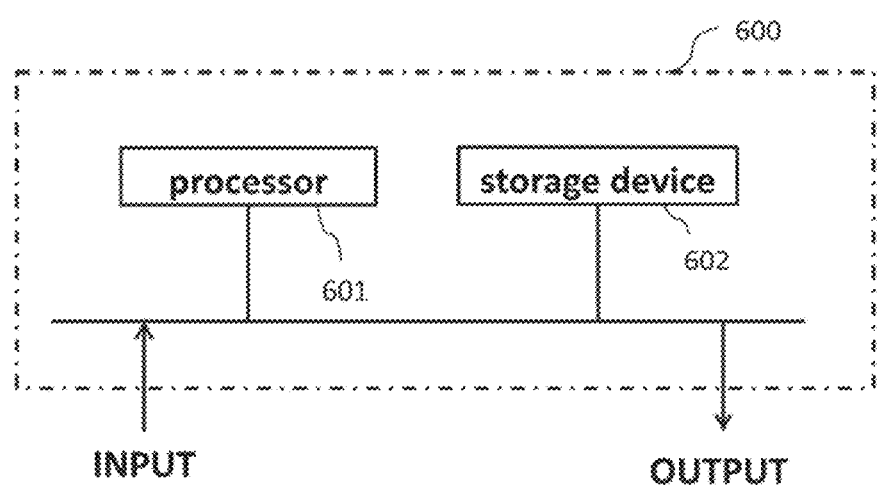

FIG. 12 is a block diagram showing a hardware configuration of the control device of the power converter according to Embodiment 1.

Figure 13:
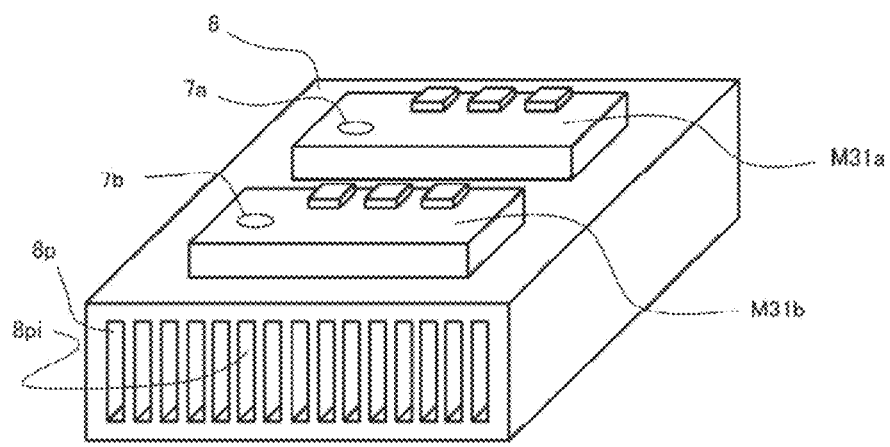

FIG. 13 is a perspective view showing an example in which modules each forming each of two arms constituting a sub inverter of a power converter according to Embodiment 2 are mounted on a cooler.

Figure 14:
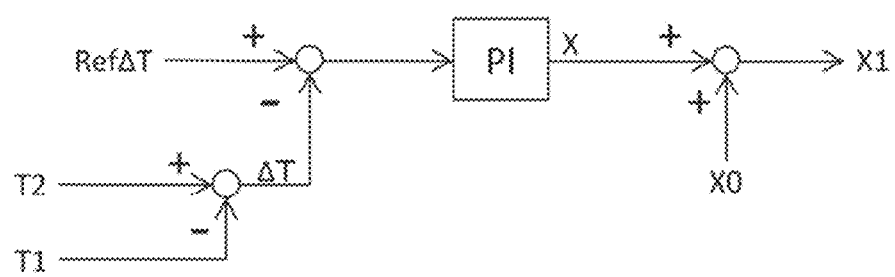

FIG. 14 is a block diagram showing a control system using temperature information in a control device of the power converter according to Embodiment 2.

MODES FOR CARRYING OUT INVENTION

Embodiment 1

Figure 1:
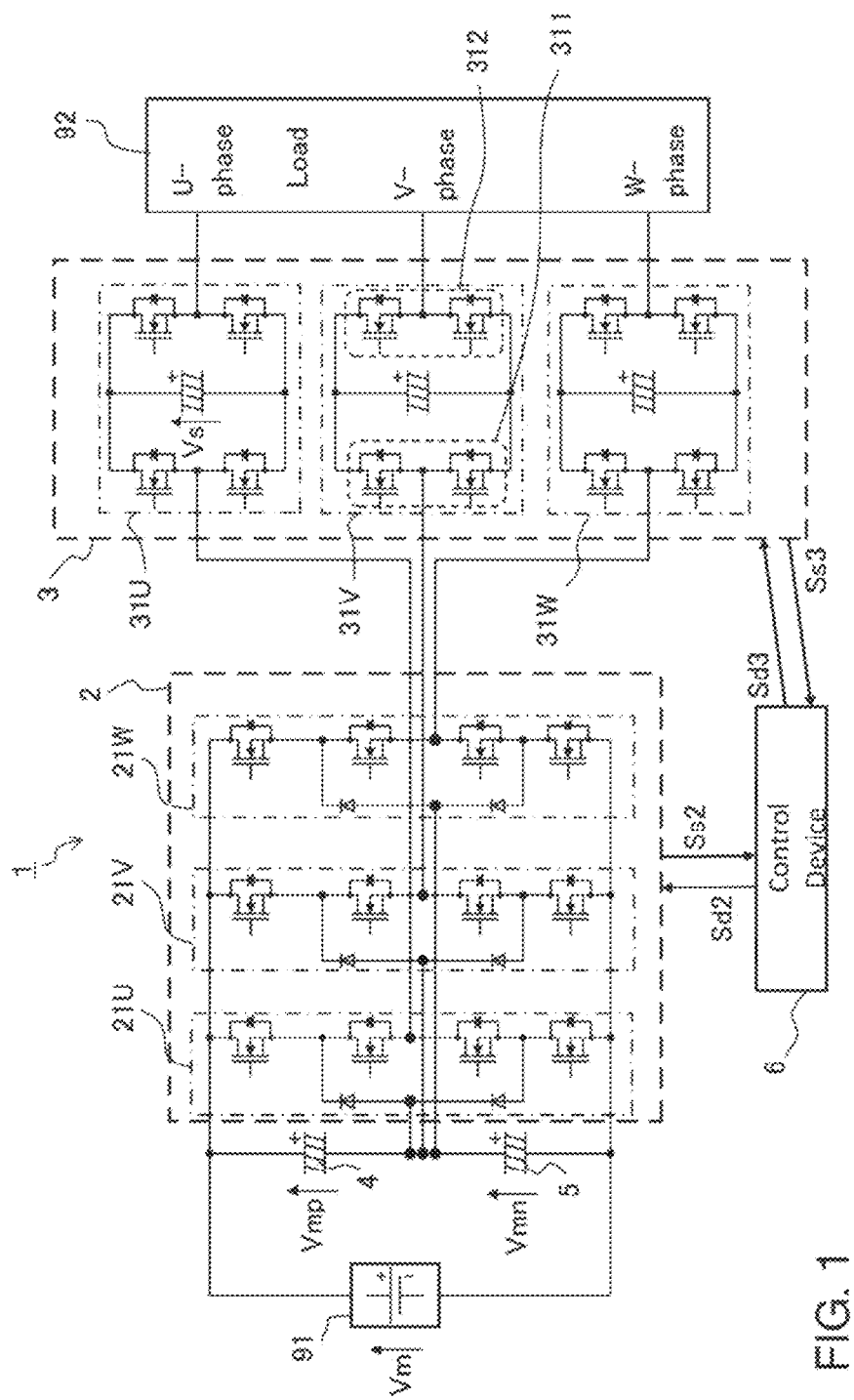
FIG. 1 is a circuit configuration diagram for explaining a configuration of a power converter according to Embodiment 1.
Figure 2:
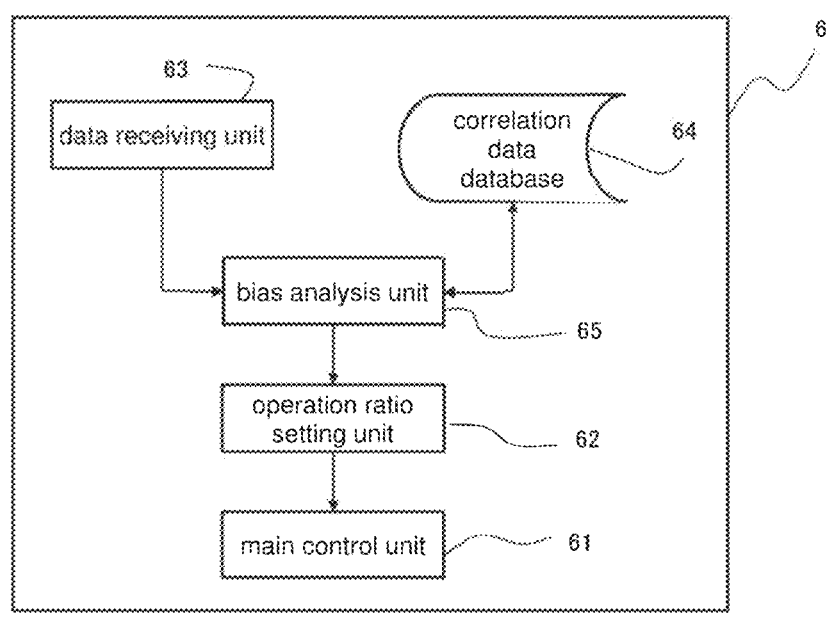
FIG. 2 is a functional block diagram for explaining a configuration of a control device of the power converter according to Embodiment 1.
Figure 3:
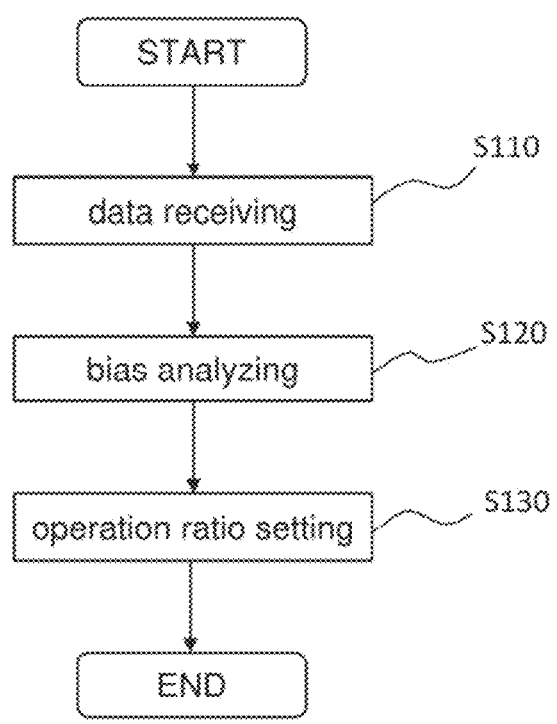
FIG. 3 is a flow chart for explaining an operation of the control device of the power converter according to Embodiment 1.
Figure 4:
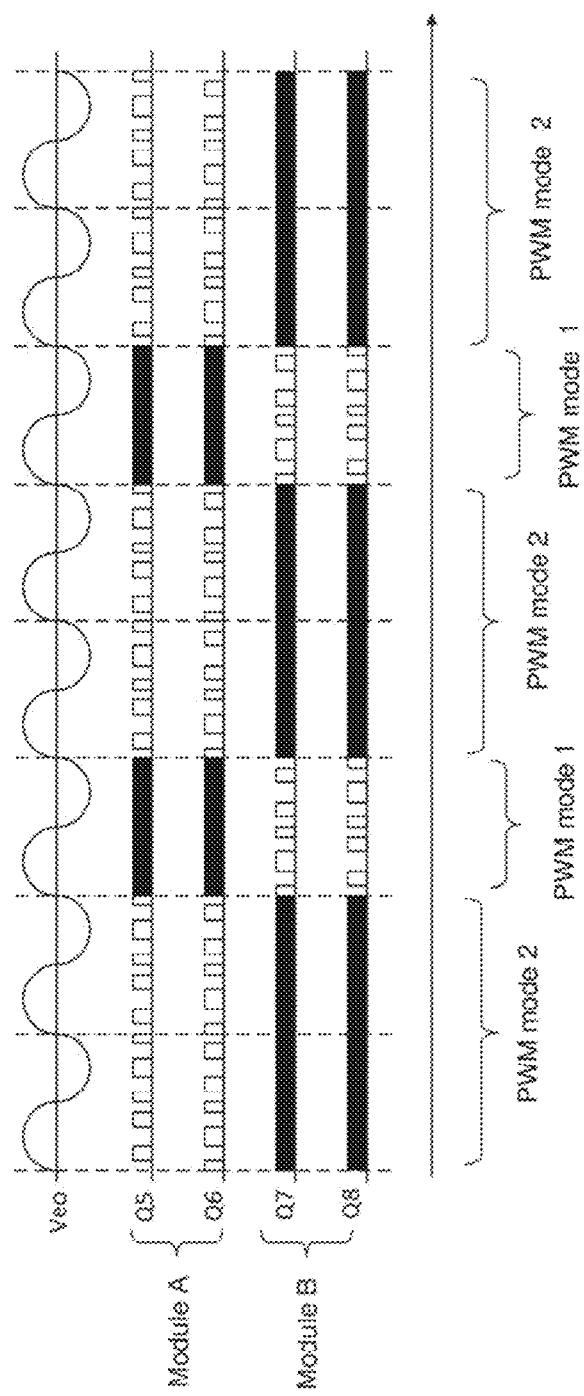
FIG. 4 is a waveform diagram showing an output waveform of the power converter according to Embodiment 1 and a gate waveform of each of four switching elements constituting a sub inverter.

FIG. 1 to FIG. 4 are for explaining a configuration and an operation of a power converter according to Embodiment 1, FIG. 1 is a circuit configuration diagram including a power supply and a load for explaining a configuration of the power converter, FIG. 2 is a functional block diagram for explaining a configuration of a control device of the power converter, FIG. 3 is a flowchart for explaining an operation in setting an operation ratio for two operation modes in the control device of the power converter, and FIG. 4 is a waveform diagram showing an output waveform of the power converter and a gate waveform of each of four switching elements (semiconductor elements) constituting a sub inverter.

Figure 5:
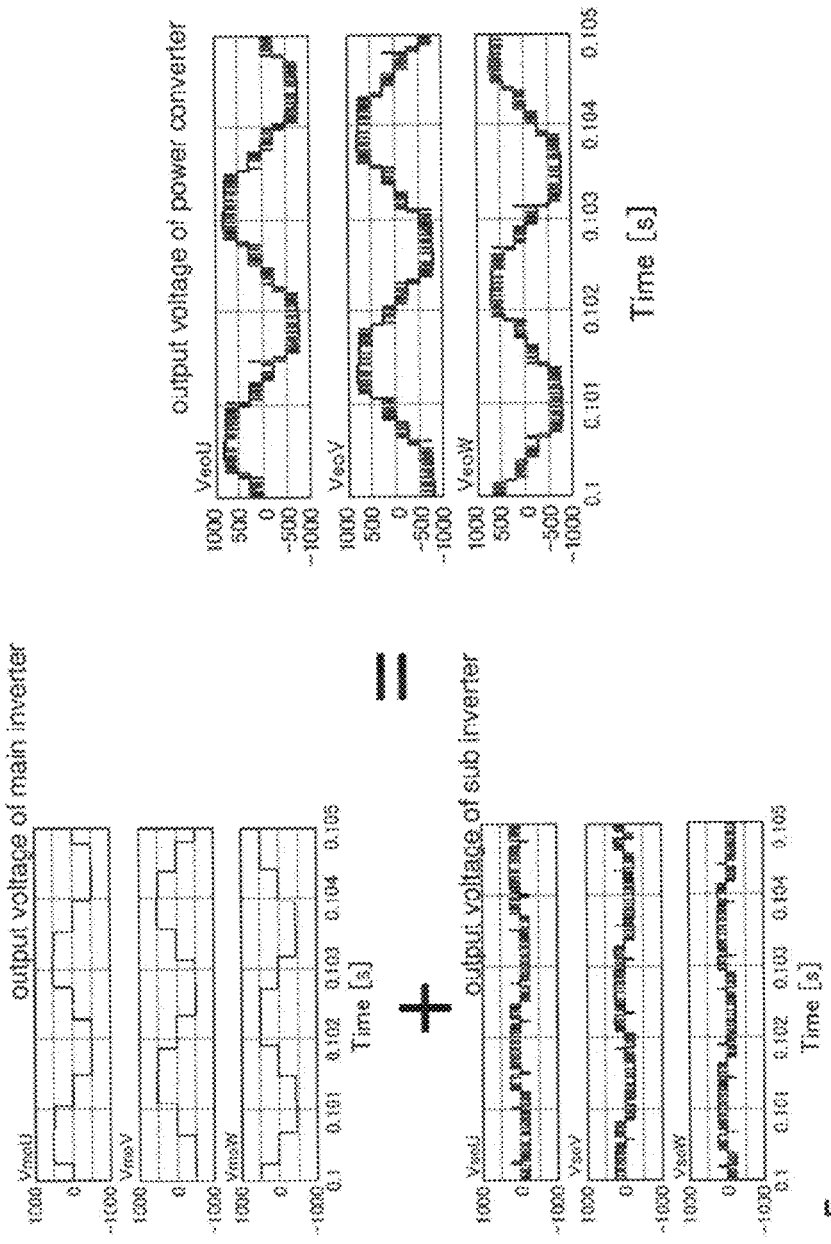
FIG. 5 is a schematic diagram showing a relationship between output waveforms of a main inverter, output waveforms of the sub inverter, and output waveforms as the power converter in a gradationally controlled voltage inverter adopted by the power converter according to Embodiment 1.
Figure 6A:
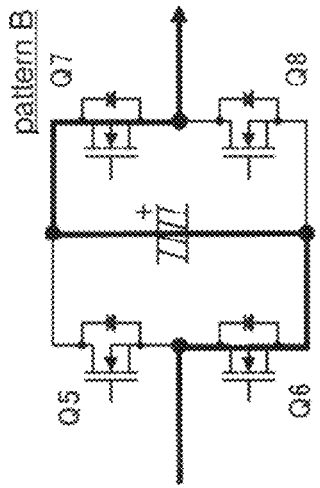
FIG. 6A to FIG. 6D each are a schematic diagram showing a current path at positive current polarity formed by a switching pattern for changing an voltage output in the sub inverter in the gradationally controlled voltage inverter adopted by the power converter in Embodiment 1.
Figure 6B:
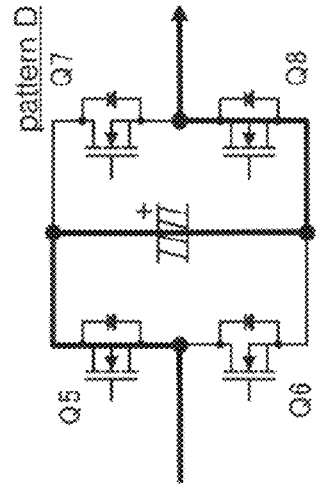
Figure 6C:
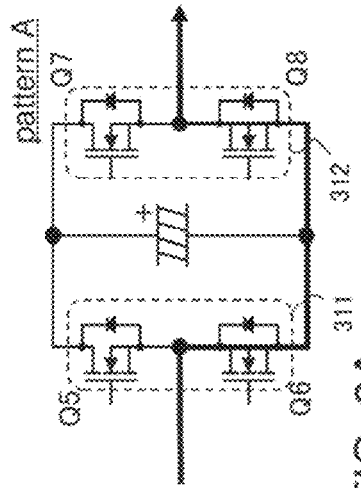
Figure 6D:
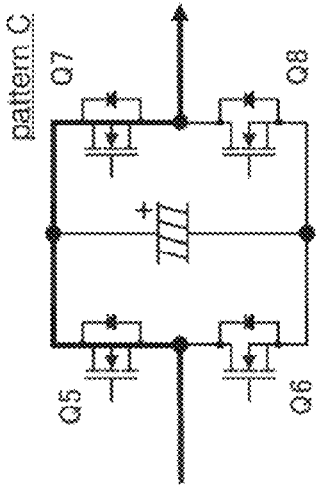
Figure 7:
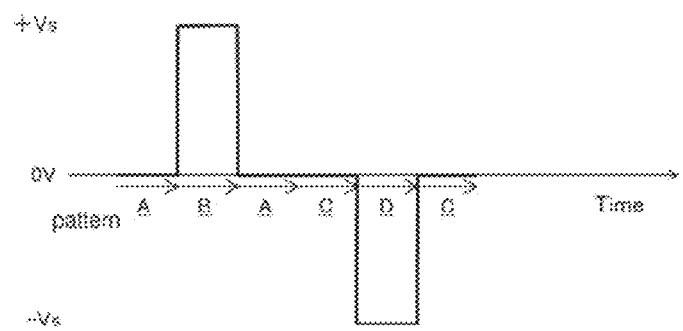
FIG. 7 is a waveform diagram showing a change in the switching pattern in a first mode in which the sub inverter outputs a positive voltage as the PWM output in the gradationally controlled voltage inverter adopted by the power converter according to Embodiment 1.
Figure 8:
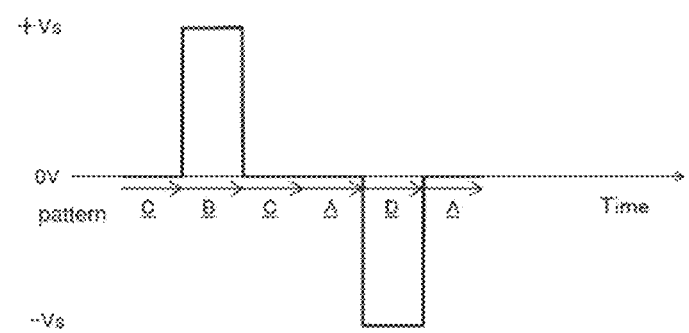
FIG. 8 is a waveform diagram showing a change in the switching pattern in a second mode in which the sub inverter outputs a positive voltage as the PWM output in the gradationally controlled voltage inverter adopted by the power converter according to Embodiment 1.

FIG. 5 to FIG. 11D are for explaining a typical configuration and operation as a gradationally controlled voltage inverter adopted in the power converter, and FIG. 5 is a schematic diagram showing a relationship for each of phases between output waveforms of the main inverter, output waveforms of the sub inverter, and output waveforms of the power converter, that is, the gradationally controlled voltage inverter, FIG. 6A to FIG. 6D each are a schematic diagram showing a current path at positive current polarity formed by a switching pattern of four switching elements for changing a voltage output in the sub inverter, FIG. 7 is a waveform diagram showing a change in a switching pattern in a first mode among two modes at which the sub inverter outputs a positive voltage in the PWM output, and FIG. 8 is a waveform diagram showing a change of a switching pattern in a second mode. Note that, in FIG. 6A to FIG. 8, a sub inverter of any of multiple phases is represented.

Figure 9:
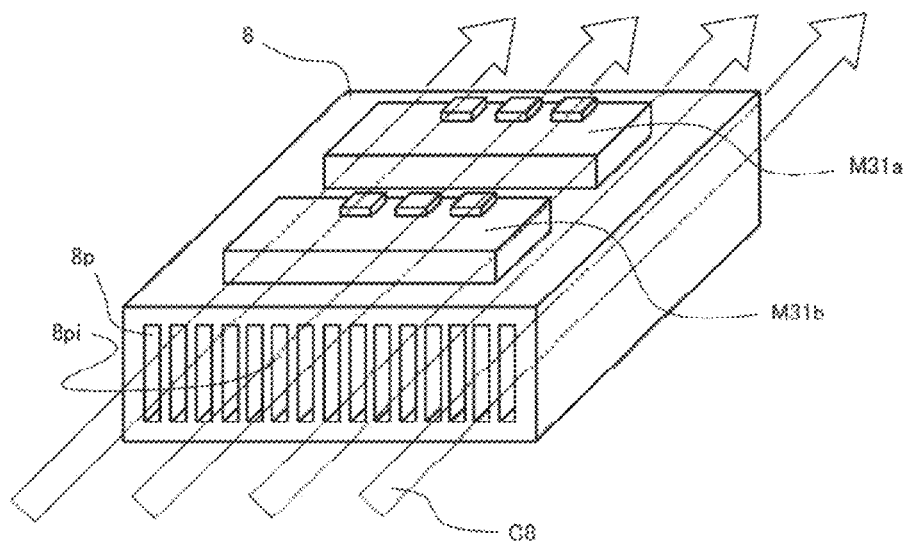
FIG. 9 is a perspective view showing an example in which the modules each forming each of the two arms constituting the sub inverter of the gradationally controlled voltage inverter adopted by the power converter of Embodiment 1 are mounted on a cooler of a forced air cooling type.

FIG. 9 is a perspective view showing an example in which modules each forming each of two arms constituting the sub inverter of the gradationally controlled voltage inverter are mounted on a cooler of a forced air cooling type, and FIG. 10A is a side view showing an example in which the modules each forming each of the two arms constituting the sub inverter of the gradationally controlled voltage inverter are mounted on a cooler of a natural air cooling type, and FIG. 10B is a cross sectional view taken along the A-A line in FIG. 10A. Further, each of FIG. 11A to FIG. 11D is a schematic diagram showing a current path at negative current polarity formed by a switching pattern for changing a voltage output in the sub inverter in the gradationally controlled voltage inverter, which corresponds to respective FIGS. 6A to 6D.

As shown in FIG. 1, the power converter 1 is connected between a DC power source 91 and an AC load 92 such as an AC motor to convert DC power (voltage) to desired AC power (voltage) to drive the load 92. The main inverter 2 and the sub inverter 3 are connected in series as the gradationally controlled voltage inverter. The DC power source 91 may be a separate DC power supply system or a storage system such as a solar cell, other than the supply through DC wiring. The load 92 is assumed to be, for example, a three-phase motor, but it is not limited thereto.

The main inverter 2 is a three-phase inverter, and a three-level inverter is described in the present embodiment, but of course an inverter with a different output level may be used. The main inverter 2 is configured with three output phases: a U-phase main inverter arm 21U, a V-phase main inverter arm 21V, and a W-phase main inverter arm 21W. It includes four switching elements (semiconductor elements) such as insulated gate bipolar transistors (IGBTs) and metal-oxide semiconductor field-effect transistors (MOSFETs), which have switching capability for each output phase, and two rectifying elements such as diodes, which have rectifying capability. As the rectifying elements, the IGBTs, the MOSFETs and the like can be used instead of diodes.

The sub inverter 3 is connected in series to respective output terminals of the U-phase main inverter arm 21U, the V-phase main inverter arm 21V, and the W-phase main inverter arm 21W of the main inverter 2. Unit sub inverters 31 constituting the sub inverter 3 are referred to as a U-phase sub inverter 31U, a V-phase sub inverter 31V, and a W-phase sub inverter 31W for each of the phases. Note that, for the arms, the phase distinguishing symbols (U, V, W) are omitted. Each of the unit sub inverters 31 is a full-bridge inverter constituted by two arms (arm 311 and arm 312), and constituted by two switching elements such as the IGBTs, the MOSFETs, etc. for each bridge (arm), which have switching capability.

Because the main inverter 2 is a three-level inverter, two capacitors are connected in series at the neutral point for dividing a DC bus voltage Vm. The capacitor on the high-potential side is denoted as a P-bus capacitor 4 and its voltage value is denoted as Vmp, and the capacitor on the low-potential side is denoted as N-bus capacitor 5 and its voltage value is denoted as Vmn. Note that a DC bus voltage Vs of the sub inverter 3 is smaller than the voltage of the DC power source 91, which is the DC bus voltage Vm of the main inverter 2.

Then, with the main inverter 2, the control device 6 receives a detection signal Ss2 indicating an operating state of the main inverter 2 and transmits a drive signal Sd2 for controlling the operation of the main inverter 2. Similarly, between the control device 6 and the sub inverter 3, a reception of a detection signal Ss3 indicating the operating state of the sub inverter 3 and a transmission of a drive signal Sd3 for controlling the operation of the sub inverter 3 are performed.

The configuration described above is similar to the typical configuration as a gradationally controlled voltage inverter.

The configuration of the power converter in the present application is to change the operation ratio in accordance with the status for each of the arm 311 and the arm 312 in the sub inverter 3, but before describing the characteristic configuration, the gradationally controlled voltage inverter, which is a premise, will be described.

An output voltage Veo as the power converter 1 appears as the total value of an output voltage Vmo of the main inverter 2 and an output voltage Vso of the sub inverter 3, as shown in FIG. 5. In the figure, U, V, and W are added at the ends of the symbols to distinguish them as the voltage for each phase.

The switching frequency of the main inverter 2 is about the same as the power supply frequency as the AC power supply for the load 92, and in the present embodiment, the main inverter 2 with the large bus voltage performs switching once at the time of positive/negative change in one cycle. The waveforms at the upper left in the figure are the output waveforms of the output voltage Vmo of the main inverter 2. On the other hand, the sub inverter 3 with the smaller bus voltage performs switching at a higher frequency than the main inverter 2. The sub inverter 3 outputs the difference between a target voltage as the power converter 1 and the output voltage of the main inverter 2. The waveforms at the lower left in the figure are the output waveforms of the output voltage Vso of the sub inverter 3.

Then, as described above, the output of the main inverter 2 (output voltage Vmo) and the output of the sub inverter 3 (output voltage Vso) are added in series to output as the output of the power converter 1 (output voltage Veo). As a result, multi-level waveforms close to sine waves can be output as the output voltage Veo of the power converter 1, as shown in the waveforms on the right side in the figure. In the present embodiment, the gradationally controlled voltage inverter outputs waveforms in seven levels.

Because the gradationally controlled voltage inverter is configured in this way, high-frequency switching is performed only on the sub-inverter 3 side, where the DC bus voltage Vs is lower than the DC bus voltage Vm. This results in a lower switching loss and noise than a typical inverter (single-stage). Therefore, the power converter 1 using the gradationally controlled voltage inverter can be smaller and lighter than the single-stage inverter because a cooler, a noise filter, and other components can be made smaller.

Here, four switching patterns by four semiconductor elements Q5 to Q8 for changing the voltage output in the sub-inverter 3, which is the full-bridge inverter, will be explained using FIG. 6A to FIG. 6D. In a pattern A, as shown in FIG. 6A, when the semiconductor element Q6 and the semiconductor element Q8 are turned on (others are off, and the same hereinafter), the output of the sub inverter 3 becomes 0. In a pattern B, as shown in FIG. 6B, when the semiconductor element Q6 and the semiconductor element Q7 are turned on, the output of the sub inverter 3 becomes positive Vs (positive voltage). In a pattern C, as shown in FIG. 6C, when the semiconductor element Q5 and the semiconductor element Q7 are turned on, the output of the sub inverter 3 becomes 0. In a pattern D, as shown in FIG. 6D, when the semiconductor element Q5 and the semiconductor element Q8 are turned on, the output of the sub inverter 3 becomes negative Vs (negative voltage). Note that the above values ignore voltage drops caused by the semiconductor devices, wiring, etc.

By switching the above patterns sequentially as shown in FIG. 7, the change of the output voltage as shown in the lower left of FIG. 5 can be achieved. The sub-inverter 3 performs unipolar modulation, and when it outputs a positive voltage (+Vs) as the PWM output, switching between the pattern A and the pattern B is used. Further, when it outputs a negative voltage (−Vs) as the PWM output, switching between the pattern C and the pattern D is used. The above case is referred to as a PWM mode 1 (first mode).

Furthermore, by switching the above patterns sequentially as shown in FIG. 8, the change of the output voltage as shown in the lower left of FIG. 5 can also be achieved. To output the positive voltage (+Vs) as the PWM output, switching between the pattern C and pattern B is used. Further, to output the negative voltage (−Vs) as the PWM output, switching between the pattern A and the pattern D is used. The above case is referred to as a PWM mode 2 (second mode).

In either mode, the PWM output is possible, but the semiconductor elements being subject to high-frequency switching operation differ depending on the mode. When the positive voltage is output in the PWM mode 1, the semiconductor element Q5 and the semiconductor element Q6 are fixed to be off and on, respectively, the semiconductor element Q7 and the semiconductor element Q8 are switched alternately at a high frequency, and thus the pattern A and the pattern B are switched alternately. When the negative voltage is output, the semiconductor element Q5 and the semiconductor element Q6 are fixed to be on and off, respectively, the semiconductor element Q7 and the semiconductor element Q8 are switched alternately at the high frequency, and thus the pattern C and the pattern D are switched alternately.

On the other hand, when the positive voltage is output in the PWM mode 2, the semiconductor element Q7 and the semiconductor element Q8 are fixed to be on and off, respectively, the semiconductor element Q5 and the semiconductor element Q6 are switched alternately at the high frequency, and thus the pattern C and the pattern B are switched alternately. When the negative voltage is output, the semiconductor device Q7 and the semiconductor device Q8 are fixed to be off and on, respectively, the semiconductor device Q5 and the semiconductor device Q6 are switched alternately at the high frequency, and thus the pattern A and the pattern D are switched alternately.

The targets of the high-frequency switching in the PWM mode 1 are the semiconductor device Q7 and the semiconductor device Q8, and the semiconductor device Q5 and the semiconductor device Q6 are switched only at the timing when the output voltage of the sub inverter 3 is switched between the positive and negative polarity.

Therefore, the amount of heat generation in the semiconductor device Q7 and the semiconductor device Q8 is larger than that of the semiconductor device Q5 and the semiconductor device Q6 due to the switching loss difference.

Conversely, the targets of the high-frequency switching in the PWM mode 2 are the semiconductor device Q5 and the semiconductor device Q6, and the semiconductor device Q7 and the semiconductor device Q8 switch only at the timing when the output voltage of the sub inverter 3 is switched between the positive and negative polarity.

Therefore, the amount of heat generation in the semiconductor device Q5 and the semiconductor device Q6 is larger than that of the semiconductor device Q7 and the semiconductor device Q8 due to the switching loss difference.

Here, if there is no difference in heat dissipation characteristics between the module in which the semiconductor device Q5 and the semiconductor device Q6 are mounted and the module in which the semiconductor device Q7 and the semiconductor device Q8 are mounted, the temperature of both modules is uniform if the operation ratio between the PWM mode 1 and the PWM mode 2 is set to 1 to 1. In practice, however, the heat dissipation characteristic will vary depending on the positions where the modules are installed on the cooler.

For example, consider the case where a module M31*a* and a module M31*b* (If they are not distinguished, they are referred to as a module M31) are arranged in a forced-air-cooled cooler 8 as shown in FIG. 9. Here, the module M31*a* and the module M31*b* are the 2-in-1 type power modules in which the semiconductor element Q5 and the semiconductor element Q6 connected in series, and the semiconductor element Q7 and the semiconductor element Q8 connected in series are mounted and constitute the arms 311 and 312, respectively. In a case of the cooling by the sensible heat of a cooling medium C8 (*air*), in the cooler 8, the temperature of the cooling medium C8 rises in a flow channel 8*p* from the side of an inlet 8*pi* toward the side of an outlet, so that the temperature difference (driving force for heat transfer) between the modules and the cooling medium C8 is larger on the side of the inlet 8*pi* than on the outlet side, and the heat dissipation characteristic is good. In other words, the module M31*b* tends to have better heat dissipation characteristic than the module M31*a* in the arrangement shown in FIG. 9. Note that, in the figure, forced air cooling is used, but as long as it is cooled by the sensible heat, water cooling also has the same effect.

As shown in FIG. 10A and FIG. 10B, a case can be considered in which the module M31*a* and the module M31*b* may be arranged in series along the vertical direction Dv on the cooler 8 of the natural air cooling type. Heated air becomes lighter in the specific gravity and flows upward. Therefore, when the flow channel 8*p* is formed in the vertical direction between fins 8*f*, the air flows upward in the flow channel 8*p* toward a top face 8*st* by receiving heat from the fins 8*f*, so that the temperature of the cooling medium closer to the bottom face 8*sb* is lower and the heat dissipation characteristic becomes better on the side of the bottom face 8*sb* than on the side of the top face 8*st*. In other words, the module M31*b* has higher cooling efficiency than module M31*a*.

In this way, the heat dissipation characteristic, or cooling efficiency, varies depending on the arrangement position of the module M31. Therefore, even in the case in which the characteristics of the module M31*a* and the module M31*b* are substantially the same, if the operation ratio between the PWM mode 1 and the PWM mode 2 is fixed at 1 to 1, the temperature of the semiconductor will be higher in the module M31*a* located on the side of the poor characteristic. The reason why the characteristics are described as "substantially the same" is that there is a characteristic error for each semiconductor or for each lot, so it is unlikely that they will be exactly the same.

Therefore, in the power converter 1 according to the present embodiment, as shown in FIG. 2, the control device 6 is provided with an operation ratio setting unit 62 that sets the operation ratio between the PWM mode 1 and the PWM mode 2 in accordance with the heat-related situation such as the heat dissipation and the heat generation of the module M31. With regard to heat-related data, a data receiving unit 63 for receiving data indicating a status of the module M31 such as the installation status (status data) and a correlation data database 64 for storing correlation data between the status data and the heat dissipation characteristics are provided. Then, a bias analysis unit 65 is provided to analyze a temperature bias caused by the difference in the heat dissipation characteristics on the basis of the data received by the data receiving unit 63 and the stored correlation data. Accordingly, the operation ratio setting unit 62 is to be configured to set the operation ratio on the basis of the bias information analyzed by the bias analysis unit 65 and to output the information of the set operation ratio to a main control unit 61 that generates the drive signal Sd3.

Here, apart from the situation described with reference to FIG. 9 and FIG. 10A, FIG. 10B, the two modules M31 are referred to as a module A and a module B, and an operation for the situation where the heat dissipation characteristic in the module B gets worse than the module A will be described with reference to the flowchart of FIG. 3. It is assumed that the semiconductor element Q5 and the semiconductor element Q6 constituting one (arm 311) of the two arms 311 and 312 of an unit sub inverter 31 are mounted on the module A, and the semiconductor element Q7 and the semiconductor element Q8 constituting the other (arm 312) are mounted on the module B.

In this case, in the PWM mode 1 described above, the loss of the module B is greater than the loss of the module A (heat generation) because the semiconductor device Q7 and the semiconductor device Q8 perform high-frequency PWM switching. On the other hand, in the PWM mode 2, the loss of the module A is greater than the loss of the module B (heat generation) because the semiconductor device Q5 and the semiconductor device Q6 perform high-frequency PWM switching.

When the power converter 1 is operated in such a situation, the data receiving unit 63, for example, receives the status data indicating that the module B is located on the downstream side of the flow channel of the cooling medium in the forced cooling, with respect to the module A (step S110). At this time, it is assumed that the correlation data database 64 stores correlation data indicating that there is a two-fold difference in the heat dissipation characteristics between the upstream side and the downstream sides.

Then, using the correlation data stored in the correlation data database 64, the bias analysis unit 65 analyzes a bias that the heat dissipation characteristic of the module A becomes twice as large as the heat dissipation characteristic of the module B, which results in a higher temperature rise in the module B (step S120). Then, the operation ratio setting unit 62 sets the operation ratio between the PWM mode 1 and the PWM mode 2 to 1 to 2 in accordance with the bias (step S130), and outputs the information of the set operation ratio (2 to 1) (1 to 2) to the main control unit 61. Note that the data receiving unit 63 may directly receive the status data indicating that the heat dissipation characteristic of the module A is twice as large as that of the module B, and in this case, it is not necessary to use the correlation data in the correlation data database 64.

In this way, by setting the operation ratio in accordance with the status of the modules, the sub inverter 3 operates in the waveforms shown in FIG. 4. In other words, by increasing the ratio for the PWM mode 1 with respect to the PWM mode 2, the loss of module B can be reduced and the loss of the module A having the excellent heat dissipation characteristic can be increased as compared with the case where the ratio is fixed one to one.

As described above, the operation ratio between the PWM mode 2 and the PWM mode 1 can be changed in accordance with the ratio of the heat dissipation characteristic for each of the modules M31 constituting the sub inverter 3. Thus, the bias of the temperature rise of the semiconductor device can be suppressed, and the module and the cooler 8 can be reduced in size.

The operation ratio described above may be changed as needed during the operation. For example, even if the positional relationship of the cooling medium in the flow direction is fixed, the quality of the cooling medium C8 may change with the air pressure, the temperature, and other conditions depending on the flight altitude, as in an aircraft. In this case, if the bias of the heat dissipation characteristics changes depending on the quality of the cooling medium C8, the bias analysis unit 65 may correct the bias in accordance with the flight altitude, for example, by using correlation data, and notify the operation ratio setting unit 62.

In the above example, the operation at the positive current polarity was explained, but this is not a limitation. For a case at the negative current polarity, four switching patterns by the four semiconductor elements Q5 to Q8 for changing the voltage output in the sub inverter 3, which is the full-bridge inverter, will be explained using FIG. 11A to FIG. 11D.

Figure 11A:
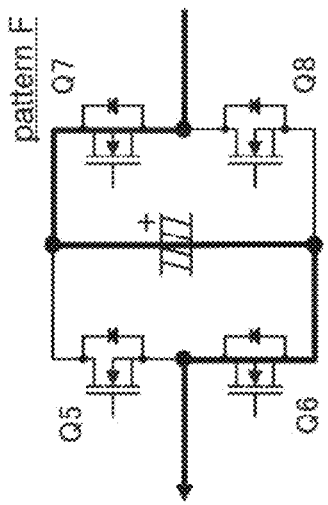
Figure 11B:
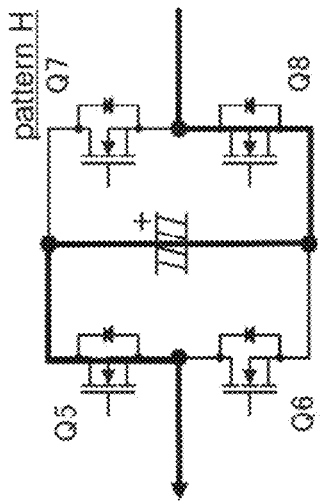
Figure 11C:
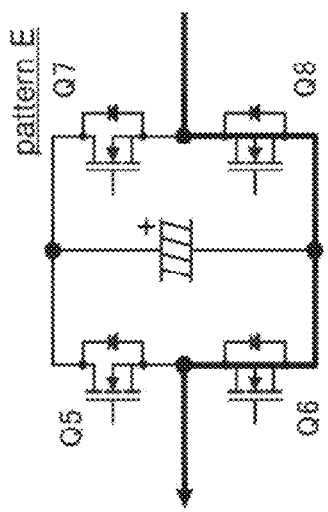
Figure 11D:
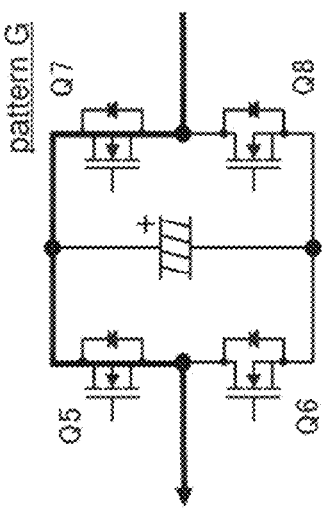

In a pattern E, as shown in FIG. 11A, when the semiconductor element Q6 and the semiconductor element Q8 are turned on, the output of the sub inverter 3 becomes 0. In a pattern F, as shown in FIG. 11B, when the semiconductor element Q6 and the semiconductor element Q7 are turned on, the output of the sub inverter 3 becomes positive Vs (positive voltage). In a pattern G, as shown in FIG. 11C, when the semiconductor element Q5 and the semiconductor element Q7 are turned on, the output of the sub inverter 3 becomes 0. In a pattern H, as shown in FIG. 11D, when the semiconductor element Q5 and the semiconductor element Q8 are turned on, the output of the sub inverter 3 becomes negative Vs (negative voltage).

These are similar to the patterns described in FIG. 6A to FIG. 6D: the pattern E is similar to the pattern A, the pattern F is similar to the pattern B, the pattern G is similar to the pattern C, and the pattern H is similar to the pattern D. Therefore, the ratio of the loss can be controlled by the operation ratio between the PWM mode 1 and the PWM mode 2 at the negative current polarity as at the positive current polarity.

Note that the control device 6 may be constituted by one piece of hardware 600 equipped with a processor 601 and a storage device 602, as shown in FIG. 12. The storage device is not shown, but is provided with a volatile storage device such as a random access memory and a nonvolatile auxiliary storage device such as a flash memory. In addition, a hard disk as the auxiliary storage device may be provided instead of the flash memory. The processor 601 executes a program input from the storage device 602. In this case, the program is input from the auxiliary storage device to the processor 601 via the volatile storage device. In addition, the processor 601 may output data such as calculation results to the volatile storage device of the storage device 602 or may store the data in the auxiliary storage device via the volatile storage device.

Embodiment 2

In Embodiment 1 described above, an example of analyzing the bias of the temperature from the heat dissipation characteristics of the modules to set the operation ratio was explained. An example of setting the operation ratio on the basis of a measured value of the temperature of a module will be described in Embodiment 2.

FIG. 13 and FIG. 14 are for explaining a power converter according to Embodiment 2, FIG. 13 is a perspective view showing an example in which modules each forming each of two arms constituting a sub inverter of a power converter is mounted on a cooler, and FIG. 14 is a block diagram showing a control system using temperature information in a control device of the power converter. Note that the configuration and the operation other than analysis of a bias and setting of the operation ratio using a measurement value of temperature as heat-related information are the same as in Embodiment 1, and FIG. 1 to FIG. 11D used in Embodiment 1 are referred to, so that the explanation of the same part will be omitted.

Also in Embodiment 2, it is assumed that the semiconductor element Q5 and the semiconductor element Q6 constituting the arm 311 of the two arms 311 and 312 of the unit sub inverter 31 are mounted on the module A, and the semiconductor element Q7 and the semiconductor element Q8 constituting the arm 312 are mounted on the module B. In Embodiment 2, as shown in FIG. 13, it is assumed that a temperature sensor 7a for measuring the temperature of the module A and a temperature sensor 7b for measuring the temperature of the module B are provided.

Then, instead of the data of the installation status described in Embodiment 1, a detected value T1 of the temperature sensor 7a and a detected value T2 from the temperature sensor 7b each are input to the control device (data receiving unit 63) as shown in FIG. 14 (corresponding to step S110). The operation ratio setting unit 62 changes the operation ratio between the PWM mode 1 and the PWM mode 2 so that the difference between the detected value T1 and the detected value T2 (temperature difference $\Delta T$) approaches a target temperature difference Ref$\Delta T$. That is, the difference (amount of deviation) between the temperature difference $\Delta T$, which is the bias of the temperature, and the target temperature difference Ref$\Delta T$ is analyzed (corresponding to step S120) to set the operation ratio (corresponding to step S130).

More specifically, like a typical controller, a control amount X(%) corresponding to a set operation ratio is calculated with respect to the deviation amount obtained by subtracting $\Delta T$ from the target temperature difference Ref$\Delta T$. For example, the parts corresponding to the operation ratio setting unit 62, the data receiving unit 63 and the bias analysis unit 65 described in FIG. 2 may be replaced by a typical proportional integral controller (PI controller) that performs proportional control. Then, if the initial ratio for the PWM mode 1 is X0(%), the operation ratio for the PWM mode 1 is X1(%) obtained by adding X(%) to X0(%). In this case, a value in which X1(%) is subtracted from 100% is the operation ratio for the PWM mode 2.

With this control, when the temperature of the module A (detected value T1) is higher than the temperature of the module B (detected value T2) ($\Delta T<0$), the amount of deviation becomes a positive value and the control amount X becomes large, so that the ratio X1 for the PWM mode 1 is high and the ratio for the PWM mode 2 is low. Therefore, the loss of the module B increases (heat generation increases), the loss of the module A decreases (heat generation decreases), and the heat generation ratio changes in the direction such that the temperature difference $\Delta T$ approaches the target temperature difference Ref $\Delta T$.

On the other hand, when the temperature of the module B (detected value T2) is higher than that of the module A (detected value T1) ($\Delta T>0$), the amount of deviation becomes a negative value and the control amount X becomes small, so that the ratio X1 for the PWM mode 1 is low and the ratio for the PWM mode 2 is high. Therefore, the loss of the module A increases (heat generation increases), the loss of the module B decreases (heat generation decreases), and the heat generation ratio changes in the direction such that the temperature difference $\Delta T$ approaches the target temperature difference Ref$\Delta T$.

Note that the initial ratio X0 should be 50%. However, if the operation ratio, which is set in accordance with the installation status described in Embodiment 1, is used as the initial ratio X0 instead of limiting it to 50% (fixed value), the temperature difference can be suppressed from the initial operation stage. In addition, a PID controller (Proportional-Integral-Differential Controller, PID Controller) may be used without limiting to the PI control exemplary shown.

By using the temperature data of the module M31, not only the bias caused by the installation status of the module M31, but also the bias of the temperature rise can be suppressed in the case of the mismatch of the loss caused by the variation of the module characteristics, and the module and the cooler 8 can be reduced in size.

Although various exemplary embodiments and examples are described in the present application, various features, aspects, and functions described in one or more embodiments are not inherent in an application of a configuration disclosed in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component disclosed in another embodiment are included.

For example, although an example is shown in which the operation ratio setting unit 62 sets the operation ratio on the basis of the received data, it is not limited thereto, and the operation ratio may be set at the time of designing in advance on the basis of the bias of the temperature rise. In the case above, the operation ratio setting unit 62 may have a function as the operation ratio setting unit by holding an operation ratio predetermined and input, for example. In this case, the main control unit 61 itself may function as the operation ratio setting unit 62, and it is not necessary to treat the main control unit 61 and the operation ratio setting unit 62 as separate units.

In addition, the three-phase DC/AC inverter is exemplified, but it is not limited thereto and can be a single phase, and the application can be suitably made depending on the phase wiring system. In addition, as an optimal application example, the gradationally controlled voltage inverter was described, but it is not limited thereto, and the application can be made at least if the two arms constituting the full-bridge inverter for PWM control each are mounted on a different module M31. Furthermore, the main control unit 61, the operation ratio setting unit 62, etc., are formed in one control unit 6, but it is not a limitation, the operation ratio setting unit 62, the bias analysis unit 65, etc., which are the characteristic features of the present application, may be provided separately from the main control unit 61, for example, as an operation ratio setting device.

As described above, according to the power converter in each of the embodiments, it is provided with the full-bridge inverter (sub inverter 3 or unit sub inverter 31) constituted by two arms: the arm 311 and the arm 312, each of which is mounted on the different module M31, the main control unit 61 to drive the full-bridge inverter (sub inverter 3) by switching an operation mode on a basis of the set operation ratio between the first mode and the second mode, the first mode being a mode in which the first arm (for example, arm 311) of the two arms is made to perform a switching operation at the first frequency (low frequency) for determining the output polarity and the second arm (for example, arm 312) is made to perform a switching operation for the PWM modulation at the second frequency (high frequency) higher than the first frequency, the second mode being a mode in which the second arm (arm 312) is made to perform a switching operation at the first frequency (low frequency) and the first arm (arm 311) is made to perform a switching operation at the second frequency (high frequency), and the operation ratio setting unit 62 to set the operation ratio on the basis of the bias of the temperature rise between the modules M31. Thus, even if there are variations in the heat dissipation characteristic and the module characteristic (heat generating property) for each of the modules M31, the bias of the temperature between the modules can be suppressed by adjusting the period for the driving with the high-frequency switching, so that a compact and highly efficient power converter can be obtained.

Since the gradationally controlled voltage inverter is constituted by the main inverter 2 that outputs a single pulse in accordance with an output frequency as AC power and the full-bridge inverter (sub inverter 3) described above connected in series to the main inverter 2, further reduction in size and higher efficiency are made possible.

Furthermore, the power converter is provided with the data receiving unit 63 to receive the heat-related data for each of the modules M31, and the bias analysis unit 65 to analyze the bias of the temperature rise between the modules M31 on the basis of the data. The operation ratio setting unit 62 decreases the ratio for the first mode in the operation ratio when receiving an analysis result that the temperature of the first module (for example, module M31a) in which the first arm is mounted is higher than that of the second module (for example, module M31b) in which the second arm is mounted, and increases the ratio for the first mode when receiving an opposite analysis result. Thus, even if there are variations in the heat dissipation characteristic and the module characteristic (heat generating property) for each of the modules M31, the bias of the temperature between the modules can be suppressed by appropriately adjusting the period for the driving with the high-frequency switching on the basis of the heat-related data.

When the bias analysis unit 65 analyzes the bias of the temperature rise from the data on the heat dissipation characteristic for each of the modules M31, the bias of the temperature between the modules M31 can be reliably suppressed even if there are differences in the positional relationship on the flow channel of the cooling medium between the modules M31, the vertical positional relationship in natural cooling, or the connection status with the heat dissipation fin.

In the case above, if the correlation data database 64 is provided to hold the correlation data between the arrangement position in the cooler 8 and the heat dissipation characteristic for each of the modules M31, and the bias analysis unit 65 is configured to analyze the bias of the temperature rise from the data on the arrangement position in the cooler 8 and the correlation data for each of the modules M31, the bias of the temperature between the modules M31 can be easily suppressed without performing complicated calculation.

Furthermore, when the temperature sensors 7a and 7b are provided to measure the temperature for each of the modules M31, and the bias analysis unit 65 (or as operation ratio setting unit 62) analyzes the bias of the temperature rise on the basis of the detected values of the temperature sensors, the bias is directly analyzed by the measured values of the temperatures, so that even if the characteristic of each of the modules M31 differ or the situation changes during the operation, the bias of the temperature between the modules M31 can be reliably suppressed.

Even when the first module (for example, module M31a) and the second module (for example, module M31b) are separated on the upstream side and the downstream side to be arranged in series in the flow channel of the cooling medium C8, the bias of the temperature can be suppressed as described above, so that the degree of design freedom can be improved, and the reduction in size can be achieved and cooling efficiency can be improved.

DESCRIPTION OF REFERENCE NUMERALS AND SIGNS

1: power converter, 2: main inverter, 21U: U-phase main inverter arm, 21V: V-phase main inverter arm, 21W: W-phase main inverter arm, 3: sub-inverter (full-bridge inverter), 31: unit sub-inverter (full-bridge inverter), 311: arm, 312: arm, 4: P-bus capacitor, 5: N-bus capacitor, 6: control device, 61: main control unit, 62: operation ratio setting unit, 63: data receiving unit, 64: correlation data database, 65: bias analysis unit, 7a, 7b: temperature sensor, 8: cooler, 91: DC power source, 92: load, C8: cooling medium, M31: module, Q5, Q6, Q7, Q8: semiconductor element

The invention claimed is:

1. A power converter comprising:
a full-bridge inverter constituted by two arms each of which is mounted on a different module;
a main controller to drive the full-bridge inverter by switching an operation mode on a basis of a set operation ratio between a first mode and a second mode, the first mode being a mode in which a first arm of the two arms is made to perform a switching operation at a first frequency for determining output polarity and a second arm is made to perform a switching operation for PWM modulation at a second frequency higher than the first frequency, the second mode being a mode in which the second arm is made to perform a switching operation at the first frequency and the first arm is made to perform a switching operation at the second frequency; and
an operation ratio setting circuitry to set the operation ratio on a basis of a bias of a temperature rise between the modules.

2. The power converter according to claim 1, wherein a gradationally controlled voltage inverter is constituted by a main inverter that outputs a single pulse in accordance with an output frequency as AC power and the full-bridge inverter connected in series to the main inverter.

3. The power converter according to claim 2, further comprising:
a data receiver to receive heat-related data for each of the modules; and
a bias analyzer to analyze the bias of the temperature rise between the modules on a basis of the data, wherein
the operation ratio setting circuitry decreases a ratio for the first mode in the operation ratio when receiving an analysis result that temperature of the first module in which the first arm is mounted is higher than that of the second module in which the second arm is mounted, and increases the ratio for the first mode when receiving an opposite analysis result.

4. The power converter according to claim 3, wherein the bias analyzer analyzes the bias of the temperature rise from data on heat dissipation characteristic for each of the modules.

5. The power converter according to claim 4, further comprising:
a correlation data database to hold correlation data between an arrangement position in a cooler and the heat dissipation characteristic for each of the modules, wherein
the bias s analyzer analyzes the bias of the temperature rise from data on the arrangement position in the cooler and the correlation data for each of the modules.

6. The power converter according to claim 5, further comprising:
a temperature sensor to measure a temperature for each of the modules, wherein
the bias s analyzer analyzes the bias of the temperature rise on a basis of a detected value of the temperature sensor.

7. The power converter according to claim 4, further comprising:
a temperature sensor to measure a temperature for each of the modules, wherein
the bias s analyzer analyzes the bias of the temperature rise on a basis of a detected value of the temperature sensor.

8. The power converter according to claim 3, further comprising:
a temperature sensor to measure a temperature for each of the modules, wherein
the bias s analyzer analyzes the bias of the temperature rise on a basis of a detected value of the temperature sensor.

9. The power converter according to claim 3, wherein the first module and the second module are separated on an upstream side and a downstream side to be arranged in series in a flow channel for a cooling medium.

10. The power converter according to claim 1, further comprising:
a data receiver to receive heat-related data for each of the modules; and
a bias analyzer to analyze the bias of the temperature rise between the modules on a basis of the data, wherein
the operation ratio setting circuitry decreases a ratio for the first mode in the operation ratio when receiving an analysis result that temperature of the first module in which the first arm is mounted is higher than that of the second module in which the second arm is mounted, and increases the ratio for the first mode when receiving an opposite analysis result.

11. The power converter according to claim 10, wherein the bias analyzer analyzes the bias of the temperature rise from data on heat dissipation characteristic for each of the modules.

12. The power converter according to claim 11, further comprising:
a correlation data database to hold correlation data between an arrangement position in a cooler and the heat dissipation characteristic for each of the modules, wherein
the bias s analyzer analyzes the bias of the temperature rise from data on the arrangement position in the cooler and the correlation data for each of the modules.

13. The power converter according to claim 12, further comprising:
a temperature sensor to measure a temperature for each of the modules, wherein
the bias s analyzer analyzes the bias of the temperature rise on a basis of a detected value of the temperature sensor.

14. The power converter according to claim 12, wherein the first module and the second module are separated on an upstream side and a downstream side to be arranged in series in a flow channel for a cooling medium.

15. The power converter according to claim 11, further comprising:
a temperature sensor to measure a temperature for each of the modules, wherein
the bias s analyzer analyzes the bias of the temperature rise on a basis of a detected value of the temperature sensor.

16. The power converter according to claim 11, wherein the first module and the second module are separated on an upstream side and a downstream side to be arranged in series in a flow channel for a cooling medium.

17. The power converter according to claim 10, further comprising:
a temperature sensor to measure a temperature for each of the modules, wherein
the bias s analyzer analyzes the bias of the temperature rise on a basis of a detected value of the temperature sensor.

18. The power converter according to claim 17, wherein the first module and the second module are separated on an upstream side and a downstream side to be arranged in series in a flow channel for a cooling medium.

19. The power converter according to claim 10, wherein the first module and the second module are separated on an upstream side and a downstream side to be arranged in series in a flow channel for a cooling medium.

* * * * *